(12) United States Patent
Higaki et al.

(10) Patent No.: US 12,316,122 B2
(45) Date of Patent: May 27, 2025

(54) DIRECT-CURRENT POWER SUPPLY AND DISTRIBUTION SYSTEM

(71) Applicant: Mitsubishi Electric Corporation, Tokyo (JP)

(72) Inventors: Yusuke Higaki, Tokyo (JP); Kikuo Izumi, Tokyo (JP); Takushi Jimichi, Tokyo (JP); Tsuguhiro Takuno, Tokyo (JP); Takuya Kataoka, Tokyo (JP); Ryoji Tsuruta, Tokyo (JP); Takaharu Ishibashi, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 255 days.

(21) Appl. No.: 17/920,058

(22) PCT Filed: May 15, 2020

(86) PCT No.: PCT/JP2020/019463
§ 371 (c)(1),
(2) Date: Oct. 20, 2022

(87) PCT Pub. No.: WO2021/229803
PCT Pub. Date: Nov. 18, 2021

(65) Prior Publication Data
US 2023/0170703 A1 Jun. 1, 2023

(51) Int. Cl.
*H02J 3/38* (2006.01)
*H02J 1/06* (2006.01)
(Continued)

(52) U.S. Cl.
CPC ......... *H02J 3/38* (2013.01); *H02J 1/06* (2013.01); *H02J 1/10* (2013.01); *H02M 3/155* (2013.01); *H02M 7/12* (2013.01)

(58) Field of Classification Search
CPC ......... H02J 3/38; H02J 1/06; H02J 1/10; H02M 3/155; H02M 7/12
See application file for complete search history.

(56) References Cited

U.S. PATENT DOCUMENTS

| 2006/0139975 A1 | 6/2006 | Huang |
| 2019/0140445 A1 | 5/2019 | Takano |
| 2019/0173289 A1 | 6/2019 | Kawamoto et al. |

FOREIGN PATENT DOCUMENTS

| JP | 2006-129585 A | 5/2006 |
| JP | 2010-57231 A | 3/2010 |

(Continued)

OTHER PUBLICATIONS

Extended European search report issued on May 17, 2023, in corresponding European patent Application No. 20934980.2, 7 pages.

(Continued)

*Primary Examiner* — Daniel Cavallari
(74) *Attorney, Agent, or Firm* — XSENSUS LLP

(57) ABSTRACT

The present DC power supply and distribution system comprises: a plurality of power distribution lines each connected to a respective one of a plurality of loads; a first converter to receive an AC voltage from a commercial AC power source, convert the received AC voltage into a plurality of DC voltages and supply each of the plurality of DC voltages to a respective one of the plurality of power distribution lines; a second converter to receive a DC power from a power generating and/or storing source, convert the received DC power into a plurality of DC powers, and supply each of the plurality of DC powers to a respective one of the plurality of power distribution lines; and a controller to enhance the second converter in efficiency by controlling (Continued)

the first converter so that a ratio of the plurality of DC voltages is a predetermined first ratio.

18 Claims, 13 Drawing Sheets

(51) Int. Cl.
　　*H02J 1/10*　　　(2006.01)
　　*H02M 3/155*　　(2006.01)
　　*H02M 7/12*　　　(2006.01)

(56) References Cited

FOREIGN PATENT DOCUMENTS

| JP | 5092997 B2 | 12/2012 |
|----|------------|---------|
| WO | 2017/199462 A1 | 11/2017 |
| WO | 2018/008287 A1 | 1/2018 |
| WO | 2019/199964 A1 | 10/2019 |

OTHER PUBLICATIONS

International Search Report and Written Opinion mailed on Jul. 14, 2020, received for PCT Application PCT/JP2020/019463, filed on May 15, 2020, 8 pages including English Translation.
Office Action issued Dec. 2, 2024 in counterpart European Patent Application No. 20934980.2.

DIRECT-CURRENT POWER SUPPLY AND DISTRIBUTION SYSTEM

CROSS-REFERENCE TO RELATED APPLICATION

The present application is based on PCT filing PCT/JP2020/019463, filed May 15, 2020, the entire contents of which are incorporated herein by reference.

TECHNICAL FIELD

The present disclosure relates to a direct-current (DC) power supply and distribution system.

BACKGROUND ART

For example, Japanese Patent Application Laying-Open No. 2010-057231 (PTL 1) discloses a converter that detects consumption of a current by a load having a plurality of states, detects a state of the load based on the detected consumption of the current, and supplies the load with a power supply voltage optimal for that state.

Further, for example, WO 2018/008287 discloses a power control apparatus that acquires information from a node (a power consumption unit) on a power reception side which receives power through a power line, the information pertaining to a characteristic of a conversion device that converts voltage between the power line and a storage battery on the power reception side, and that uses the information and a characteristic of a conversion device that converts voltage between the power line and a storage battery on a power transmission side to set voltage for the power line.

CITATION LIST

Patent Literature

[PTL 1] Japanese Patent Laying-Open No. 2010-057231
[PTL 2] WO 2018/008287

SUMMARY OF INVENTION

Technical Problem

According to PTLs 1 and 2, if the converter's output voltage is controlled so as to reduce the load's power consumption, the converter's power consumption will increase, which may result in a system generally decreased in efficiency.

It is therefore a major object of the present disclosure to provide a highly efficient DC power supply and distribution system.

Solution to Problem

The presently disclosed DC power supply and distribution system comprises a plurality of power distribution lines, a first converter, a second converter, and a first controller. The plurality of power distribution lines are each connected to a respective one of the plurality of loads. The first converter receives a voltage from a first power source, converts the received voltage into a plurality of DC voltages and supplies each of the plurality of DC voltages to a respective one of the plurality of power distribution lines. The second converter receives a power from a second power source, converts the received power into a plurality of DC powers and supplies each of the plurality of DC powers to a respective one of the plurality of power distribution lines. The first controller enhances the second converter in efficiency by controlling the first converter so that the ratio of the plurality of DC voltages is a predetermined first ratio.

Advantageous Effects of Invention

The present DC power supply and distribution system can generally be enhanced in efficiency as the second converter is enhanced in efficiency by controlling the first converter so that the ratio of the plurality of DC voltages is a predetermined first ratio.

DESCRIPTION OF EMBODIMENTS

First Embodiment

Figure 1:
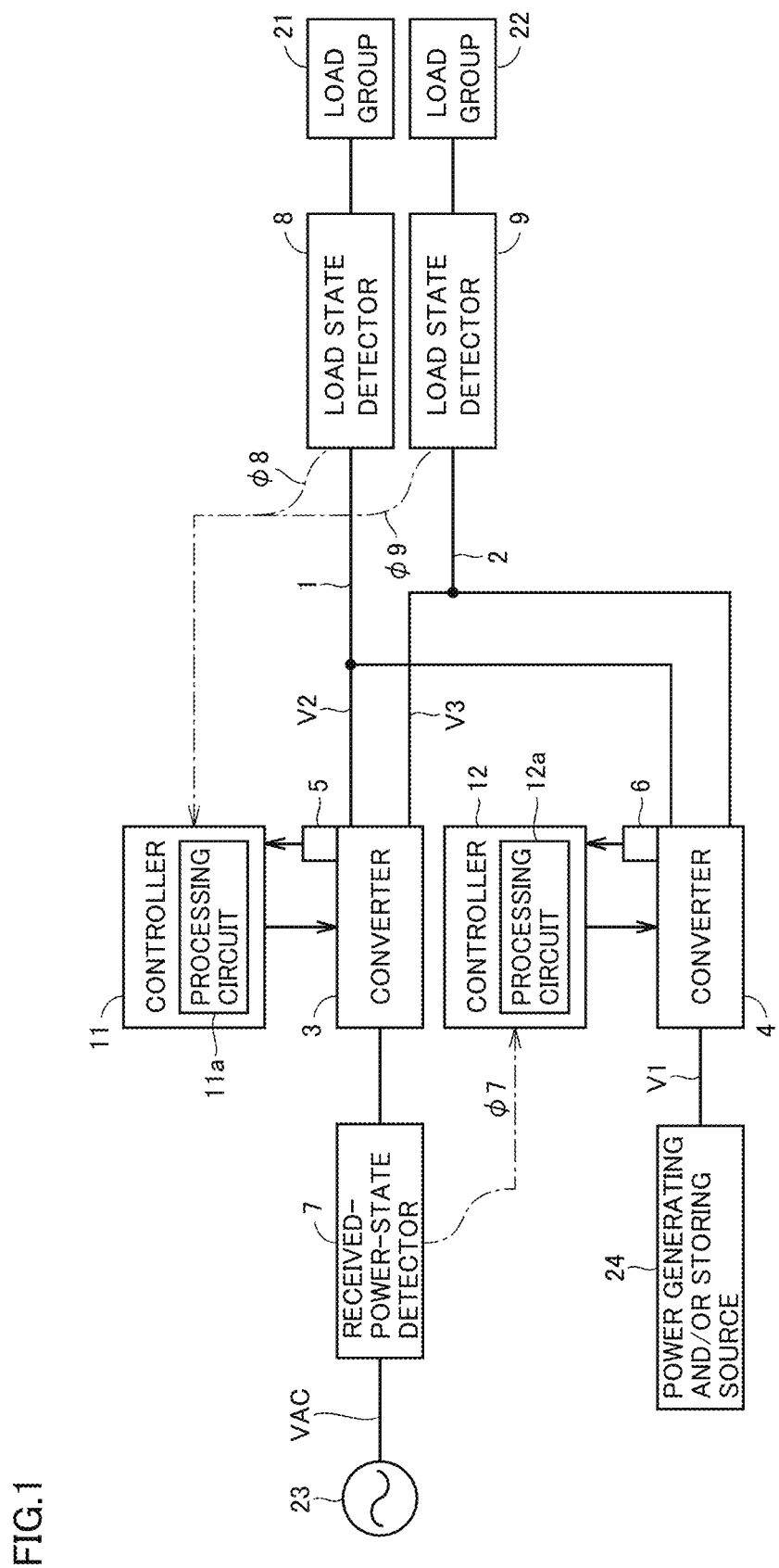
FIG. 1 is a block diagram showing a configuration of a DC power supply and distribution system according to a first embodiment.

FIG. 1 is a block diagram showing a configuration of a DC power supply and distribution system according to a first embodiment. As shown in FIG. 1, the DC power supply and distribution system comprises a plurality of (two in this example) power distribution lines 1, 2, converters 3, 4, operation information detectors 5, 6, a received-power-state detector 7, load state detectors 8, 9, and controllers 11, 12.

In general, loads are classified into loads in a general power system, such as air conditioners and elevators, loads in a factory power system, such as conveyors and presses of factories, illumination loads, and general loads such as OA equipment. These types of loads are different from one another in how they characteristically use power daily, optimal operating voltage for each different operating state, and the like. Therefore, rather than supplying these loads with the same voltage, supplying each load with a unique voltage facilitates enhancing efficiency.

At least, the power loads including those in the general power system and those in the factory power system have operation characteristics significantly different from those of the other loads (i.e., illumination loads and general loads), and therefore, supplying power loads with voltage having a value and supplying other loads with voltage having a different value make it easier to enhance efficiency.

Accordingly, in the first embodiment, loads are divided into a first group (for example, loads of a general power system) and a second group (for example, general loads), and power distribution line 1 for supplying a DC voltage V2 to a load group 21 belonging to the first group and power distribution line 2 for supplying a DC voltage V3 to a load group 22 belonging to the second group are separately provided. Load group 21 is connected to power distribution line 1, and load group 22 is connected to power distribution line 2.

Note that although supplying a DC voltage requires an electric wire on the side of a positive electrode and an electric wire on the side of a negative electrode, FIG. 1 only shows a single power distribution line for supplying a single DC voltage for simplicity of the drawings and the description.

Converter 3 (or a first converter) is controlled by controller 11, and receives an alternating-current (AC) voltage VAC from a commercial AC power source 23 serving as a main power source (or a first power source), converts the received AC voltage VAC into DC voltages V2 and V3 and supplies DC voltages V2 and V3 to power distribution lines 1 and 2, respectively.

Although supplying three-phase AC voltage from commercial AC power source 23 to converter 3 requires three electric wires, FIG. 1 only shows a single power distribution line for supplying AC voltage for simplicity of the drawings and the description.

A DC power source may be provided as the main power source instead of commercial AC power source 23. In this case, converter 3 receives DC voltage from the DC power source and converts the received DC voltage into DC voltages V2 and V3.

Figure 2:
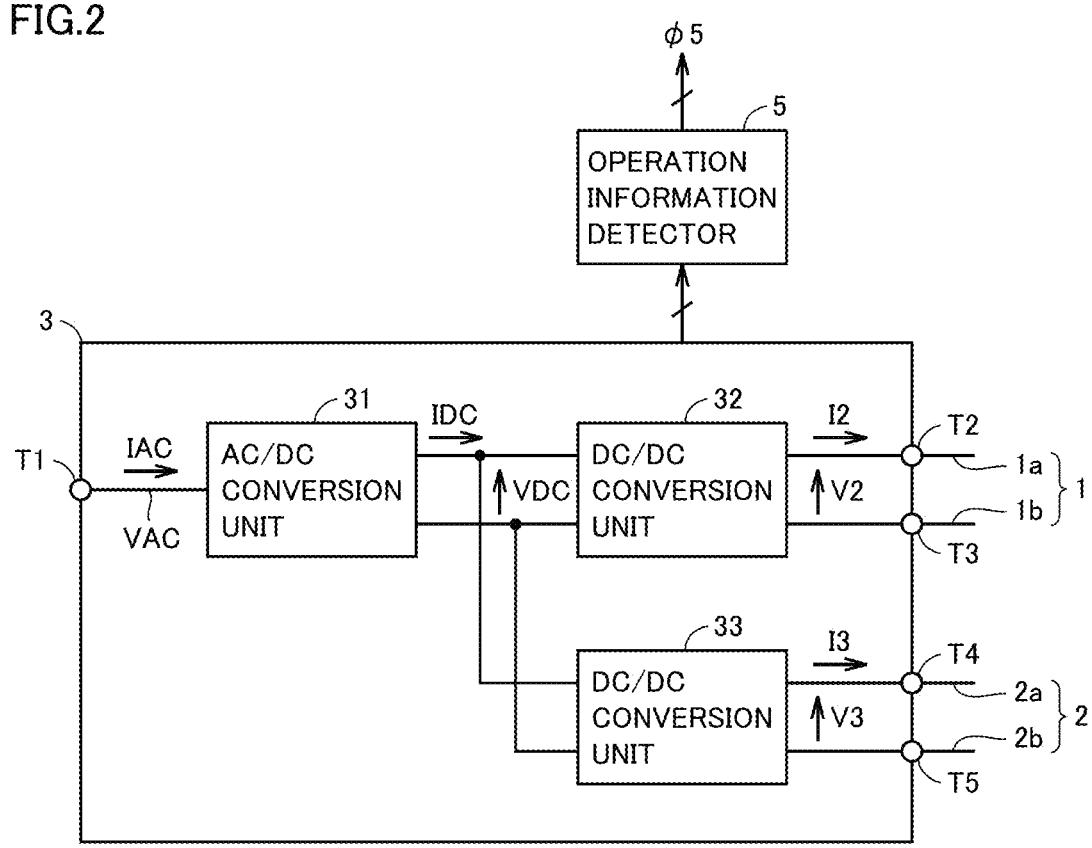
FIG. 2 is a block diagram showing a configuration of a converter 3 shown in FIG. 1.

FIG. 2 is a block diagram showing a configuration of converter 3. As shown in FIG. 2, converter 3 includes an AC terminal T1, positive terminals T2 and T4, negative terminals T3 and T5, an AC/DC conversion unit 31, and DC/DC conversion units 32 and 33. AC terminal T1 receives AC voltage VAC supplied from commercial AC power source 23. Positive terminal T2 and negative terminal T3 are connected to a positive electric wire 1*a* and a negative electric wire 1*b*, respectively, included in distribution power line 1. Positive terminal T4 and negative terminal T5 are connected to a positive electric wire 2*a* and a negative electric wire 2*b*, respectively, included in distribution power line 2.

AC/DC conversion unit 31 is controlled by controller 11, and receives AC voltage VAC from commercial AC power source 23 and converts the received AC voltage VAC into a DC voltage VAC. DC/DC conversion unit 32 is controlled by controller 11, converts a DC voltage VDC into DC voltage V2 and outputs DC voltage V2 between positive terminal T2 and negative terminal T3. DC/DC conversion unit 33 is controlled by controller 11, and converts DC voltage VDC into DC voltage V3 and outputs DC voltage V3 between positive terminal T4 and negative terminal T5.

AC/DC conversion unit 31 is a known general inverter circuit, diode rectifier, or the like. DC/DC conversion unit 32, 33 is a known general chopper converter, flyback converter, or the like.

Operation information detector 5 detects operation information φ5 of converter 3 and outputs operation information φ5 to controller 11. Operation information φ5 includes, for example, the AC/DC conversion unit 31 AC input voltage VAC, AC input current IAC, DC output voltage VDC and DC output current IDC, the DC/DC conversion unit 32 DC output voltage V2 and DC output current I2, and the DC/DC conversion unit 33 DC output voltage V3 and DC output current I3.

Converter 4 (or a second converter) is controlled by controller 12, and receives a DC power P1 from a power generating and/or storing source 24 serving as a subordinate power source (or a second power source), converts DC power P1 into two DC powers P2 and P3 and supplies DC powers P2 and P3 to power distribution lines 1 and 2, respectively.

Power generating and/or storing source 24 is a power generation apparatus that generates DC power, a battery that stores DC power, or a combination thereof, and outputs DC power. Examples of the power generation apparatus include a solar cell, a wind power generation apparatus, a tidal power generation apparatus, a geothermal power generation apparatus, and a fuel cell. Examples of the battery include a lead-acid battery and a lithium-ion battery, and some thereof are also mounted on automobiles.

Figure 3:
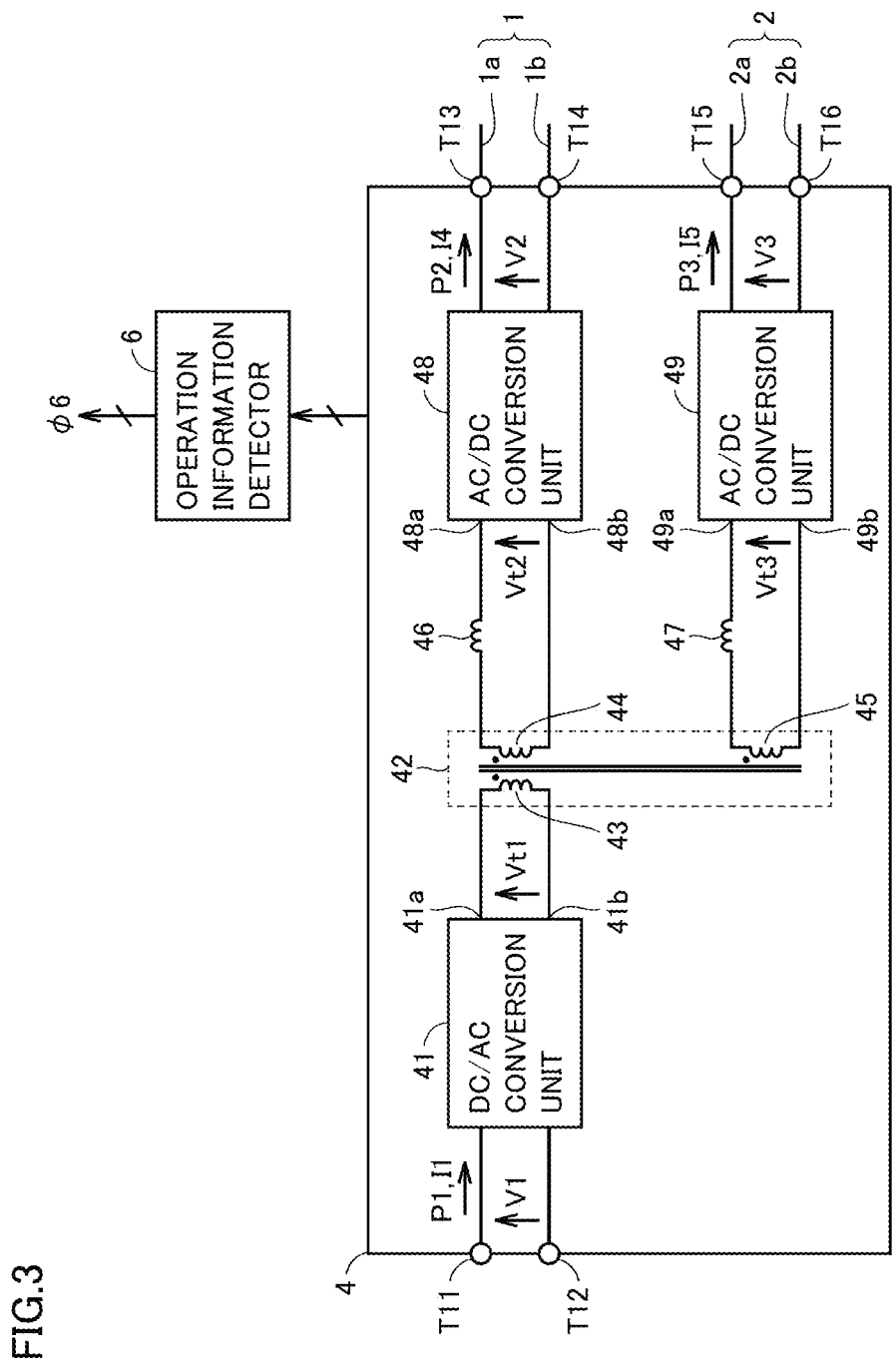
FIG. 3 is a block diagram showing a configuration of a converter 4 shown in FIG. 1.

FIG. 3 is a block diagram showing a configuration of converter 4. As shown in FIG. 3, converter 4 includes positive terminals T11, T13 and T15, negative terminals T12, T14 and T16, a DC/AC conversion unit 41, a transformer 42, reactors 46 and 47, and AC/DC conversion units 48 and 49. Positive terminal T11 and negative terminal T12 receive an inter-terminal voltage V1 of power generating and/or storing source 24. Positive terminal T13 and negative terminal T14 are connected to positive electric wire 1*a* and negative electric wire 1*b*, respectively, included in distribution power line 1. Positive terminal T15 and negative terminal T16 are connected to positive electric wire 2*a* and negative electric wire 2*b*, respectively, included in distribution power line 2.

DC/AC conversion unit 41 is controlled by controller 12, and receives DC voltage V1 from power generating and/or storing source 24, converts DC voltage V1 into an AC voltage Vt1 and outputs AC voltage Vt1 between AC terminals 41*a* and 41*b*.

Transformer 42 includes a primary winding 43 and secondary windings 44 and 45. Primary winding 43 has one terminal and the other terminal connected to DC/AC conversion unit 41 at AC terminals 41*a* and 41*b*, respectively. Secondary winding 44 has one terminal connected via reactor 46 to AC/DC conversion unit 48 at an AC terminal 48*a*, and the other terminal connected to AC/DC conversion unit 48 at an AC terminal 48*b*. Secondary winding 45 has one terminal connected via reactor 47 to AC/DC conversion unit 49 at an AC terminal 49*a*, and the other terminal connected to AC/DC conversion unit 49 at an AC terminal 49*b*.

Reactor 46, 47 may be leakage inductance included in transformer 42. Reactor 46 or 47 may be connected to primary winding 43 in series.

AC/DC conversion unit 48 is controlled by controller 12, and converts a AC voltage Vt2 that is applied between AC terminals 48*a* and 48*b* into DC voltage V2 and outputs DC voltage V2 between positive terminal T13 and negative terminal T14. AC/DC conversion unit 49 is controlled by controller 12, and converts an AC voltage Vt3 that is applied between AC terminals 49a and 49b into DC voltage V3 and outputs DC voltage V3 between positive terminal T15 and negative terminal T16.

Operation information detector 6 detects operation information $\phi 6$ of converter 4, and outputs operation information $\phi 6$ to controller 12. Operation information $\phi 6$ includes, for example, the DC/AC conversion unit 41 DC input voltage V1, DC input current I1, DC input power P1 and AC output voltage Vt1, the AC/DC conversion unit 48 AC input voltage Vt2, DC output voltage V2, DC output current I4 and DC output power P2, and the AC/DC conversion unit 49 AC input voltage Vt3, DC output voltage V3, DC output current I5 and DC output power P3.

Figure 4:
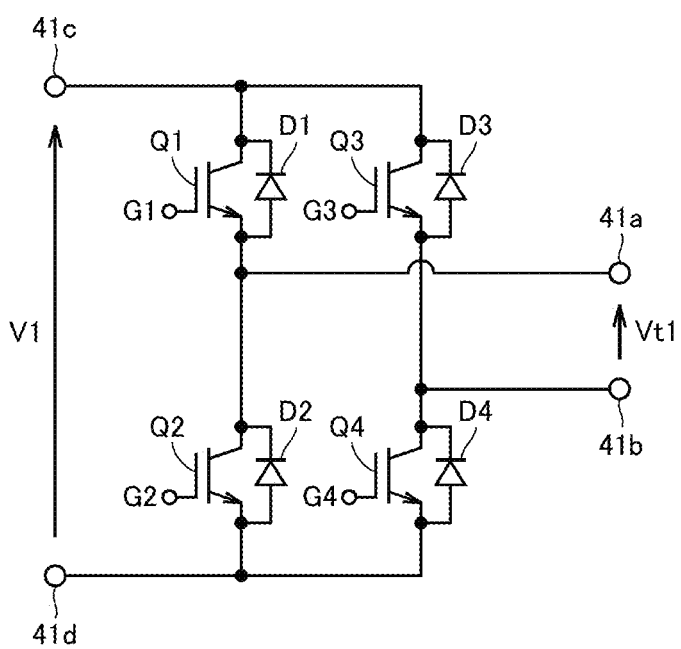
FIG. 4 is a circuit diagram showing a configuration of a DC/AC conversion unit shown in FIG. 3.

FIG. 4 is a circuit diagram showing a configuration of DC/AC conversion unit 41. As shown in FIG. 4, DC/AC conversion unit 41 is a full bridge inverter and includes IGBTs (Insulated Gate Bipolar Transistors) Q1 to Q4 and diodes D1 to D4. IGBTs Q1 and Q3 have their collectors both connected to a positive terminal 41c, their emitters connected to AC terminals 41a and 41b, respectively, and their gates receiving gate signals G1 and G3, respectively.

IGBTs Q2 and Q4 have their collectors connected to AC terminals 41a and 41b, respectively, their emitters connected to a negative terminal 41d, and their gates receiving gate signals G2 and 04, respectively. Diodes D1 to D4 are connected to IGBTs Q1 to Q4, respectively, in antiparallel. Gate signals G1 to G4 are provided from controller 12. IGBTs Q1 to Q4 turn on in response to gate signals G1 to G4, respectively, set to the "H" level, and turn off in response to gate signals G1 to G4, respectively, set to the "L" level.

Figure 5:
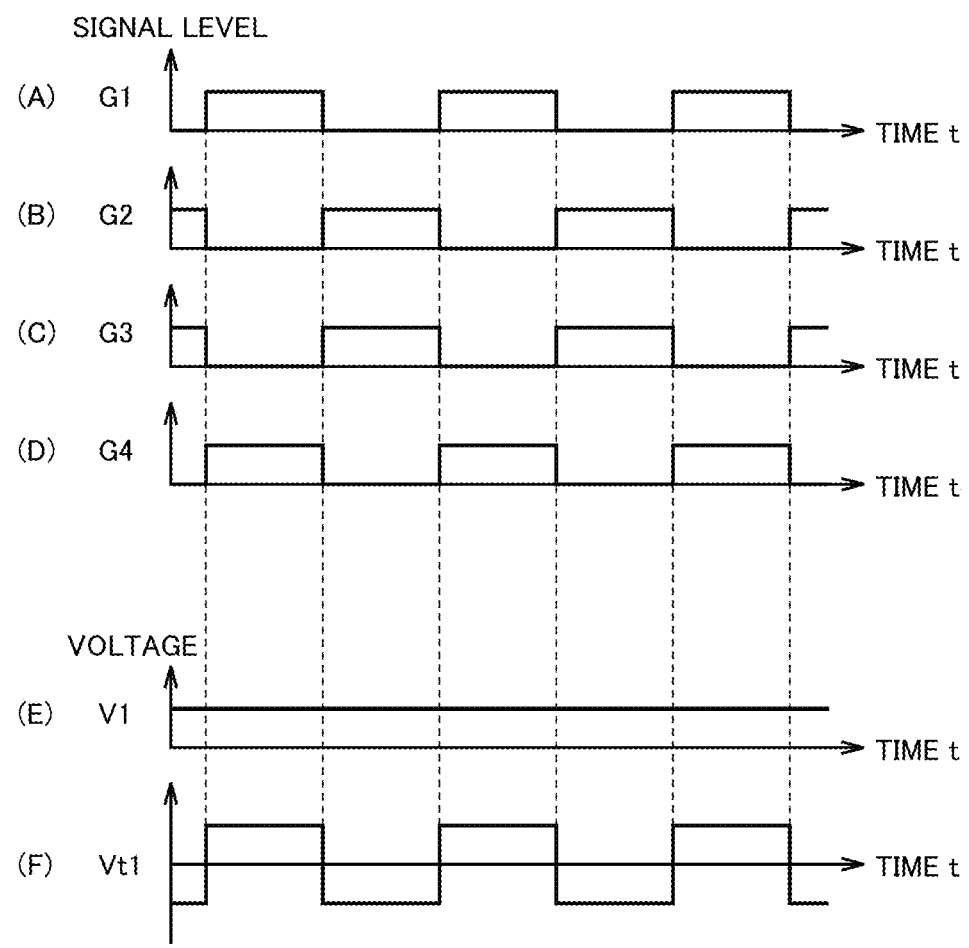
FIG. 5 is timing plots representing an operation of the DC/AC conversion unit shown in FIG. 4.

FIG. 5 is timing plots representing an operation of DC/AC conversion unit 41. As shown in FIG. 5, timing plots (A) to (D) represent gate signals G1 to G4, respectively, in waveform, and timing plots (E) and (F) represent DC voltage V1 and AC voltage Vt1, respectively, in waveform.

For simplicity of the drawings and the description, FIG. 5 does not represent transient characteristics presented when signal amplitude or voltage amplitude changes. Further, the figure does not indicate an arm short-circuit prevention period for preventing an arm short-circuit caused as upper and lower IGBTs Q1 and Q2 (or IGBTs Q3 and Q4) constituting an arm simultaneously turn on.

As shown in FIG. 5, gate signals G1 and G4 and gate signals G2 and G3 are alternately set to the "H" level, and IGBTs Q1 and Q4 and IGBTs Q2 and Q3 are alternately turned on. When IGBTs Q1 and Q4 are turned on, positive terminal 41c is connected to AC terminal 41a via IGBT Q1 and AC terminal 41b is connected to negative terminal 41d via IGBT Q4, and AC voltage Vt1 attains a positive voltage (i.e., +V1).

When IGBTs Q2 and Q3 are turned on, positive terminal 41c is connected to AC terminal 41b via IGBT Q3 and AC terminal 41a is connected to negative terminal 41d via IGBT Q2, and AC voltage Vt1 attains a negative voltage (i.e., −V1). In this manner, DC voltage V1 is converted to AC voltage Vt1.

Herein, controller 12 sets G1 (a function of time)=G4 (a function of time) in order to set positionally diagonal IGBTs Q1 and Q4 to the same operation state (an on state or an off state). Further, controller 12 sets G2 (a function of time)=G3 (a function of time) in order to set positionally diagonal IGBTs Q2 and Q3 to the same operation state (the on state or the off state).

Further, in order to bring upper and lower IGBTs Q1 and Q2 constituting an arm into a complementary operation state (the on state or the off state), controller 12 drives IGBTs Q1 and Q2 by complementary drive signals G1 and G2, respectively. That is, G1 (a function of time)=NOT {G2 (a function of time)}. Herein, NOT means logical inversion (i.e., a signal is amplified in an inverted state). Further, in order to bring upper and lower IGBTs Q3 and Q4 constituting an arm into the complementary operation state (the on state or the off state), controller 12 drives IGBTs Q3 and Q4 by complementary drive signals G3 and G4, respectively. That is, G3 (a function of time)=NOT {G4 (a function of time)}.

AC/DC conversion units 48 and 49 each have a configuration similar to DC/AC conversion unit 41 and include IGBTs Q1 to Q4 and diodes D1 to D4. AC/DC conversion unit 48 has AC terminals 48a and 48b connected to IGBTs Q2 and Q4, respectively, at their respective collectors, and IGBTs Q1 and Q2 have their respective collectors connected to positive terminal T13 and negative terminal T14, respectively. AC/DC conversion unit 49 has AC terminals 49a and 49b connected to IGBTs Q2 and Q4, respectively, at their respective collectors, and IGBTs Q1 and Q2 have their respective collectors connected to positive terminal T15 and negative terminal T16, respectively.

Returning to FIG. 1, received-power-state detector 7 detects a state of power received by converter 3, and outputs to controller 12 received-power information $\phi 7$ indicating a detection result. Received-power information $\phi 7$ includes, for example, the converter 3 AC input voltage VAC, AC input current IAC and AC input power P.

Load state detector 8 is coupled to power distribution line 1 and load group 21, and detects a state of load group 21 and outputs to controller 11 load information $\phi 8$ indicating a detection result. Load information $\phi 8$ includes, for example, the load group 21 operating rate, current consumption, power consumption, and motor rotation speed. Load state detector 9 is coupled to power distribution line 2 and load group 22, and detects a state of load group 22 and outputs to controller 11 load information $\phi 9$ indicating a detection result. Load information $\phi 9$ includes, for example, the load group 22 operating rate, current consumption, power consumption, and motor rotation speed.

Controller 11 controls converter 3 based on operation information $\phi 5$ received from operation information detector 5 and load information $\phi 8$ and $\phi 9$ received from load state detectors 8 and 9. Controller 11 controls converter 3 so that the ratio of DC voltages V2 and V3 is equal to the ratio of numbers N3 and N2 of turns of secondary windings 45 and 44 of transformer 42 and power (or current) consumption of load groups 21 and 22 is reduced. The reason for this will be described later.

The function of controller 11 can be implemented by using a processing circuit 11a. Processing circuit 11a as referred to herein refers to dedicated hardware such as a dedicated processing circuit, a processor, etc., and a storage device. When dedicated hardware is used, the dedicated processing circuit corresponds to a single circuit, a composite circuit, a programmed processor, a parallel-programmed processor, an ASIC (Application Specific Integrated Circuit), an FPGA (Field Programmable Gate Array), or a combination thereof.

When a processor and a storage device are used, each function described above is implemented by software, firmware, or a combination thereof. The software or firmware is described as a program and stored in the storage device. The processor reads and executes the program stored in the storage device. These programs can also be said to cause a computer to execute a procedure and method that implements each function described above.

The storage device corresponds to a semiconductor memory such as a RAM (random access memory), a ROM (read only memory), a flash memory, an EPROM (Erasable Programmable Read Only Memory), or an EEPROM (Electrically Erasable Programmable Read Only Memory®). The semiconductor memory may be a non-volatile memory or a volatile memory. Other than the semiconductor memory, the storage device also corresponds to a magnetic disk, a flexible disk, an optical disk, a compact disk, a mini disk, or a DVD (Digital Versatile Disc).

Further, controller 12 controls converter 4 based on operation information φ5 and φ6 received from operation information detectors 5 and 6 and received-power information φ7 received from received-power-state detector 7. Controller 12 controls converter 4 so that the ratio of DC powers P2 and P3 is equal to the ratio of inductances L3 and L2 of reactors 47 and 46 and AC input power P is smaller than a predetermined value. The reason for this control will be described later.

The function of controller 12 can be implemented by using a processing circuit 12a. Processing circuit 12a is the same as processing circuit 11a. Controllers 11 and 12 may be composed of one processing circuit.

Hereinafter will be described why converters 3 and 4 are controlled so that the ratio of DC voltages V2 and V3 of power distribution lines 1 and 2 is equal to the ratio of numbers N3 and N2 of turns of secondary windings 45 and 44 of transformer 42 and the ratio of DC powers P2 and P3 supplied from power generating and/or storing source 24 to power distribution lines 1 and 2 is equal to the ratio of inductances L3 and L2 of reactors 47 and 46.

Figure 6:
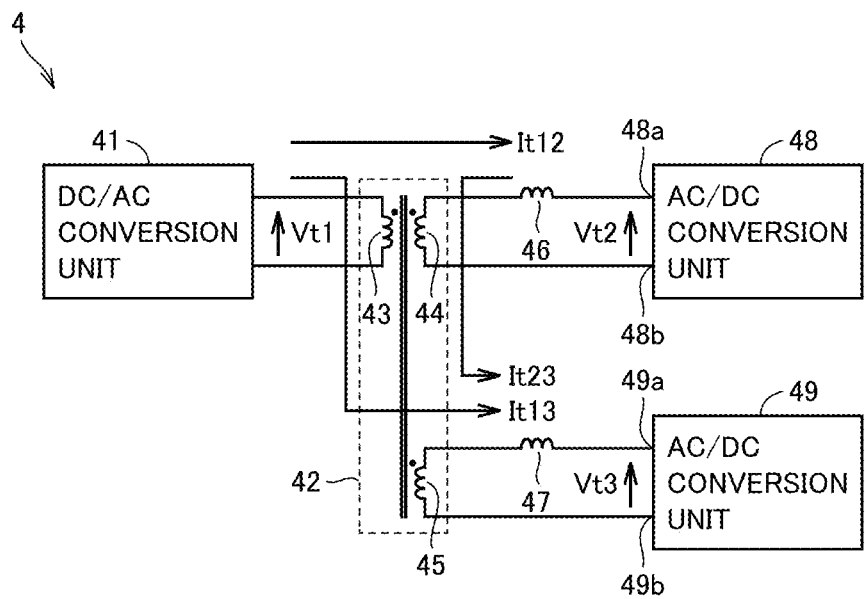
FIG. 6 is a circuit block diagram showing a current passing through a transformer shown in FIG. 3.

FIG. 6 is a circuit block diagram showing a current passing in converter 4. As shown in FIG. 6, in converter 4, a current It12 flows from DC/AC conversion unit 41 to AC/DC conversion unit 48 via transformer 42 and reactor 46, and a current It13 flows from DC/AC conversion unit 41 to AC/DC conversion unit 49 via transformer 42 and reactor 47.

When AC voltage Vt2 between AC terminals 48a and 48b of AC/DC conversion unit 48 does not match AC voltage Vt3 between AC terminals 49a and 49b of AC/DC conversion unit 49, then, for example, a current It23 flows from AC/DC conversion unit 48 to AC/DC conversion unit 49 via reactor 46, transformer 42 and reactor 47. Current It23 reduces efficiency of converter 4, and accordingly, it is necessary to reduce current It23.

Figure 7:
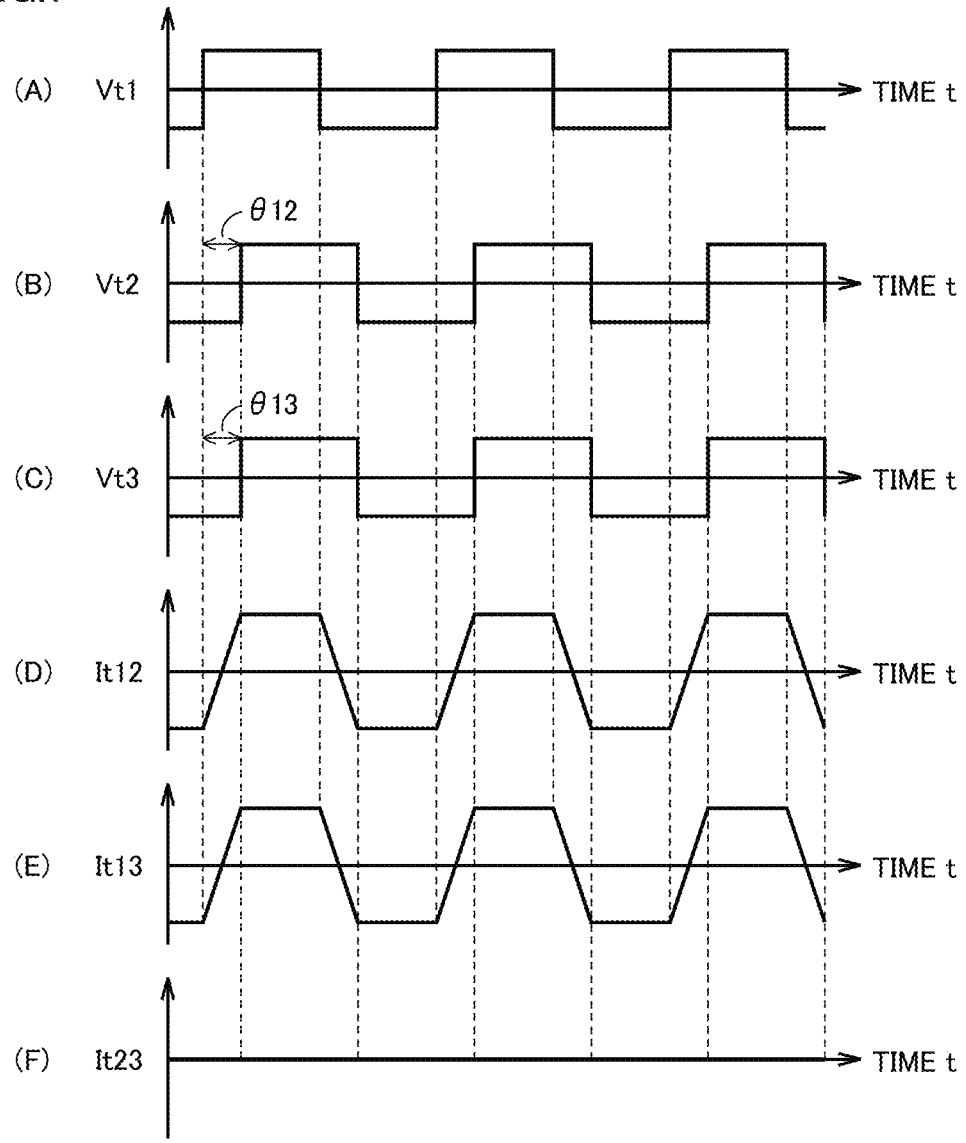
FIG. 7 is timing plots representing an operation of a converter shown in FIG. 6.

FIG. 7 is timing plots representing an operation of converter 4. In FIG. 7, timing plots (A), (B), and (C) represent AC voltages Vt1, Vt2, and Vt3, respectively, in waveform, and timing plots (D), (E), and (F) represent AC currents It12, It13, and It23, respectively, in waveform.

FIG. 7 shows a case where a phase difference θ12 between AC voltages Vt1 and Vt2 matches a phase difference θ13 between AC voltages Vt1 and Vt3 and a phase difference θ23 between AC voltages V12 and Vt3 is 0 degrees. Note, however, that, for simplicity of the drawings and the description, numbers N1, N2, and N3 of turns of windings 43, 44, and 45 of transformer 42 are assumed to be equal.

AC current It12 significantly increases or decreases for a period in which AC voltages Vt1 and Vt2 do not match in polarity (i.e., a phase offset period θ12). AC current It12 does not change for a period in which AC voltages Vt1 and Vt2 match in polarity.

Note that while AC voltages Vt1 and Vt2 match in polarity and do not match in amplitude, AC current It12 increases or decreases with a gradient corresponding to the difference between AC voltages Vt1 and Vt2, although not shown in FIG. 7 for simplicity of the drawings and the description. AC current It13 will have a waveform identical to that of AC current It12.

AC voltages Vt2 and Vt3 match in phase, and AC current It23 is maintained at 0 A. Note that while AC voltages Vt2 and Vt3 match in polarity and do not match in amplitude, AC current It23 increases or decreases with a gradient corresponding to the difference between AC voltages Vt2 and Vt3, although not shown in FIG. 7 for simplicity of the drawings and the description.

Therefore, in the case shown in FIG. 7, it can be seen that there are power transmission from DC/AC conversion unit 41 to AC/DC conversion unit 48 and power transmission from DC/AC conversion unit 41 to AC/DC conversion unit 49 and there is no power transmission from AC/DC conversion unit 48 to AC/DC conversion unit 49. That is, while converter 4 transmits a power P12 from power generating and/or storing source 24 to power distribution line 1 and transmits a power P13 from power generating and/or storing source 24 to power distribution line 2, converter 4 does not transmit a power P23 from power distribution line 1 to power distribution line 2.

Figure 8:
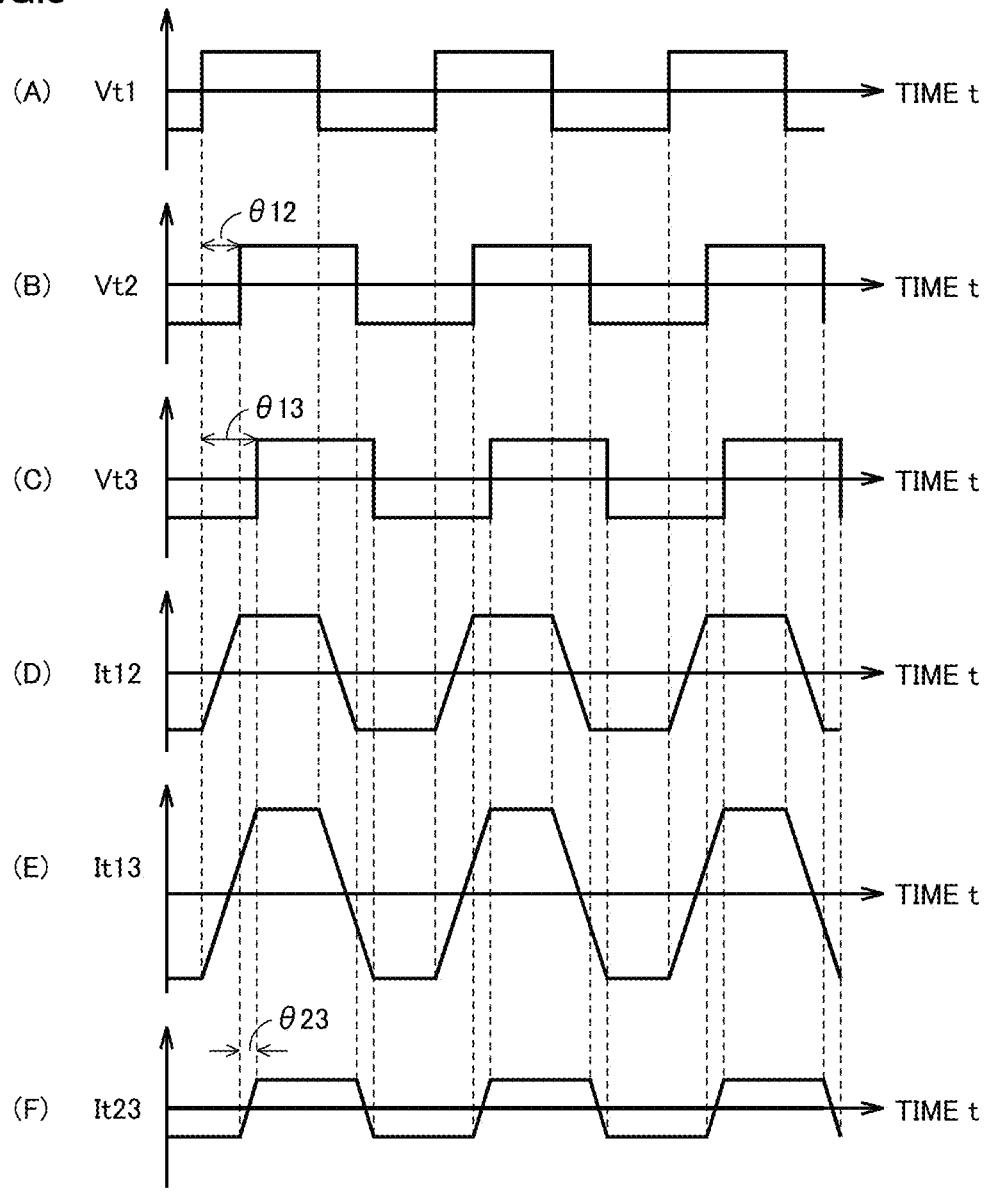
FIG. 8 is other timing plots representing an operation of the converter shown in FIG. 6.

FIG. 8 is other timing plots representing an operation of converter 4, as compared with FIG. 7. In FIG. 8, timing plots (A), (B), and (C) represent AC voltages Vt1, Vt2, and Vt3, respectively, in waveform, and timing plots (D), (E), and (F) represent AC currents It12, It13, and It23, respectively, in waveform.

FIG. 8 shows a case where phase difference θ12 between AC voltages Vt1 and Vt2 does not match phase difference θ13 between AC voltages Vt1 and Vt3 and phase difference θ23 between AC voltages Vt2 and Vt3 is not 0 degrees. Note, however, that, for simplicity of the drawings and the description, numbers N1, N2, and N3 of turns of windings 43, 44, and 45 of transformer 42 are assumed to be equal.

AC current It12 has a waveform, as shown in FIG. 8(D). AC current It13 significantly increases or decreases for a period in which AC voltages Vt1 and Vt3 do not match in polarity (i.e., a phase offset period θ13). AC current It13 does not change for a period in which AC voltages Vt1 and Vt3 match in polarity.

Note that while AC voltages Vt1 and Vt3 match in polarity and do not match in amplitude, AC current It13 increases or decreases with a gradient corresponding to the difference between AC voltages Vt1 and Vt3, although not shown in FIG. 8 for simplicity of the drawings and the description.

AC current It23 significantly increases or decreases for a period in which AC voltages Vt2 and Vt3 do not match in polarity (i.e., a phase offset period θ23). AC current It23 does not change for a period in which AC voltages Vt2 and Vt3 match in polarity.

Note that while AC voltages Vt2 and Vt3 match in polarity and do not match in amplitude, AC current It23 increases or decreases with a gradient corresponding to the difference between AC voltages Vt2 and Vt3, although not shown in FIG. 8 for simplicity of the drawings and the description.

Therefore, in the case shown in FIG. 8, it can be seen that there are power transmission from DC/AC conversion unit 41 to AC/DC conversion unit 48, power transmission from DC/AC conversion unit 41 to AC/DC conversion unit 49, and power transmission from AC/DC conversion unit 48 to AC/DC conversion unit 49. That is, converter 4 transmits power P12 from power generating and/or storing source 24 to power distribution line 1 and power P13 from power generating and/or storing source 24 to power distribution line 2, and also transmits power P23 from power distribution line 1 to power distribution line 2.

Figure 9:
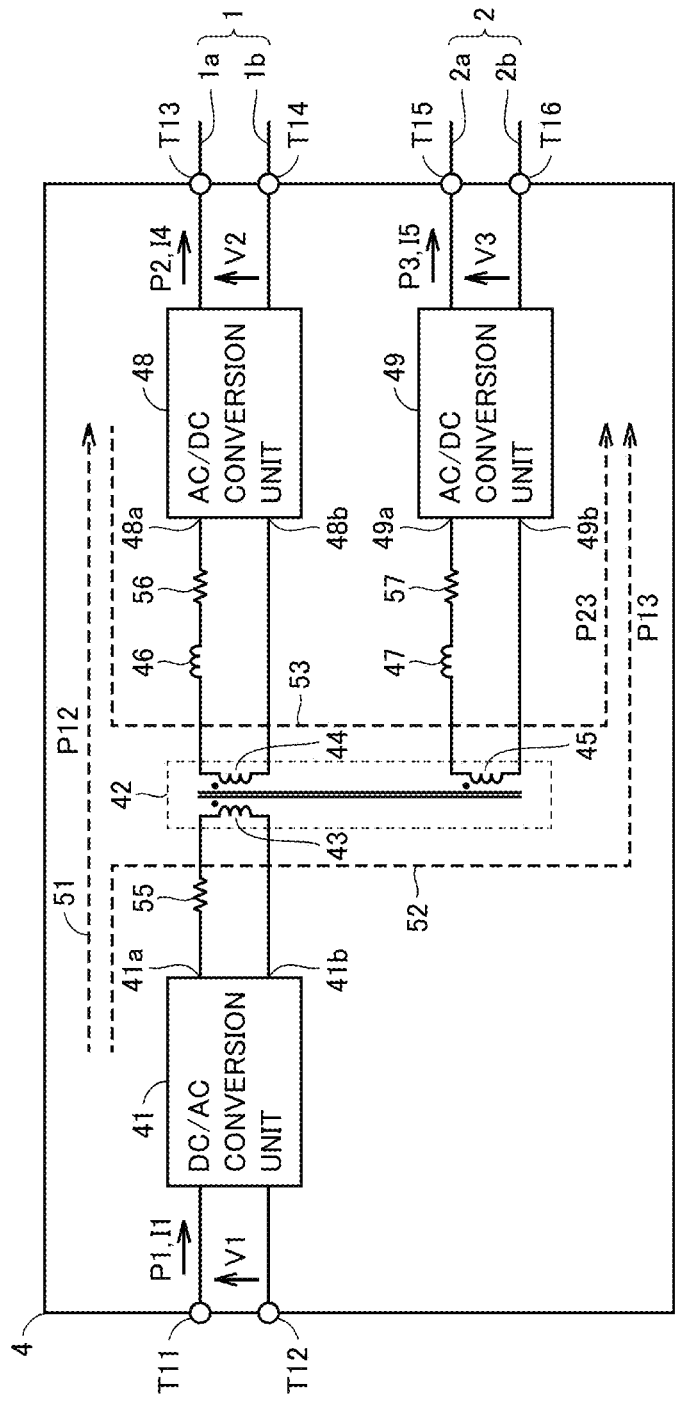
FIG. 9 is a circuit block diagram showing a power transmission path in the converter shown in FIG. 6.

FIG. 9 is a circuit block diagram showing transmission paths 51, 52, and 53 in converter 4 for power P12, P13, and P23. Power P12 is supplied from power generating and/or storing source 24 to power distribution line 1 via transmission path 51 (that is, terminals T11 and T12, DC/AC conversion unit 41, transformer 42, reactor 46, AC/DC conversion unit 48, and terminals T13 and T14).

Power P13 is supplied from power generating and/or storing source 24 to power distribution line 2 via transmission path 52 (that is, terminals T11 and T12, DC/AC conversion unit 41, transformer 42, reactor 47, AC/DC conversion unit 49, and terminals T15 and T16). Power P23 is supplied as apart of power P12 from power generating and/or storing source 24 to power distribution line 1 via transmission path 51, and subsequently supplied from power distribution line 1 to power distribution line 2 via transmission path 53.

Further, in FIG. 9, an electrical resistance which is a factor of a loss caused in transmission paths 51 to 53 is shown as resistive elements 55 to 57. Resistive element 55 is connected between AC terminal 41a of DC/AC conversion unit 41 and one terminal of primary winding 43. Resistive element 56 and reactor 46 are connected in series between AC terminal 48a of AC/DC conversion unit 48 and one terminal of secondary winding 44. Resistive element 57 and reactor 47 are connected in series between AC terminal 49a of AC/DC conversion unit 49 and one terminal of secondary winding 45.

Power P12 passes through two resistive elements 55 and 56 of transmission path 51. Power P13 passes through two resistive elements 55 and 57 of transmission path 52. Power P23 passes through two resistive elements 55 and 56 of transmission path 51 and two resistive elements 56 and 57 of transmission path 53.

When resistive elements 55, 56, and 57 have resistance values R1, R2, and R3, respectively, power P12 has a loss of a value corresponding to the resistance values (R1+R2) of resistive elements 55 and 56, power P13 has a loss of a value corresponding to the resistance values (R1+R3) of resistive elements 55 and 57, and power P23 has a loss of a value corresponding to the resistance values (R1+R2+R2+R3) of resistive elements 55, 56, 56, and 57. Power P23 thus reduces converter 4 in efficiency, and power P23 needs to be reduced.

A method of reducing power P23 will now be described with reference to a mathematical expression. Transformer 42 has windings 43, 44 and 45 with numbers N1, N2 and N3, respectively, of turns, reactors 46 and 47 contain inductances L2 and L3, respectively, power generating and/or storing source 24 provides DC voltage V1, and power distribution lines 1 and 2 provide DC voltages V2 and V3, respectively, for the sake of illustration. Further, AC voltages Vt1 and Vt2 have phase difference θ12, AC voltages Vt1 and Vt3 have phase difference θ13, and AC voltages Vt2 and Vt3 have phase difference θ23 for the sake of illustration (see FIGS. 6 to 8).

Further, a switching angular frequency obtained by multiplying a switching frequency Fsw of IGBTs Q1 to Q4 (see FIG. 4) by $2\pi$ is represented as $\omega$ [rad/s]. While switching angular frequency $\omega$ is often used as a constant value, switching angular frequency $\omega$ may be changed in accordance with some command value to apply frequency modulation control.

A relationship between power P12 and phase difference θ12, a relationship between power P13 and phase difference θ13, a relationship between power P23 and phase difference θ23, and a relationship between phase difference θ23 and phase differences θ12 and θ13 are represented by Equations (1) to (4), respectively.

$$P_{12} = \frac{\left(\frac{N_2}{N_1}\right)V_1 V_2}{\omega L_2}\theta_{12} \tag{1}$$

$$P_{13} = \frac{\left(\frac{N_3}{N_1}\right)V_1 V_3}{\omega L_3}\theta_{13} \tag{2}$$

$$P_{23} = \frac{V_2\left(\frac{N_2}{N_3}\right)V_3}{\omega\left\{L_2 + \left(\frac{N_2}{N_3}\right)^2 L_3\right\}}\theta_{23} \tag{3}$$

$$\theta_{23} = \theta_{13} - \theta_{12} \tag{4}$$

A relationship between power P2=P12−P23 net-output to power distribution line 1 (see FIG. 9) and phase differences θ12 and θ13 is expressed by Equation (5) derived from Equations (1) to (4).

$$P_2 = \frac{\left(\frac{N_2}{N_1}\right)V_1 V_2}{\omega L_2}\theta_{12} - \frac{V_2\left(\frac{N_2}{N_3}\right)V_3}{\omega\left\{L_2 + \left(\frac{N_2}{N_3}\right)^2 L_3\right\}}\theta_{23} = \tag{5}$$

$$\left[\frac{\left(\frac{N_2}{N_1}\right)V_1 V_2}{\omega L_2} + \frac{V_2\left(\frac{N_2}{N_3}\right)V_3}{\omega\left\{L_2 + \left(\frac{N_2}{N_3}\right)^2 L_3\right\}}\right]\theta_{12} - \left[\frac{V_2\left(\frac{N_2}{N_3}\right)V_3}{\omega\left\{L_2 + \left(\frac{N_2}{N_3}\right)^2 L_3\right\}}\right]\theta_{13}$$

Further, a relationship between power P3=P13+P23 net-output to power distribution line 2 (see FIG. 9) and phase differences θ13 and θ23 is expressed by Equation (6) derived from Equations (1) to (4).

$$P_3 = \frac{\left(\frac{N_3}{N_1}\right)V_1 V_3}{\omega L_3}\theta_{13} + \frac{V_2\left(\frac{N_2}{N_3}\right)V_3}{\omega\left\{L_2 + \left(\frac{N_2}{N_3}\right)^2 L_3\right\}}\theta_{23} = \tag{6}$$

$$-\left[\frac{V_2\left(\frac{N_2}{N_3}\right)V_3}{\omega\left\{L_2 + \left(\frac{N_2}{N_3}\right)^2 L_3\right\}}\right]\theta_{12} + \left[\frac{\left(\frac{N_3}{N_1}\right)V_1 V_3}{\omega L_3} + \frac{V_2\left(\frac{N_2}{N_3}\right)V_3}{\omega\left\{L_2 + \left(\frac{N_2}{N_3}\right)^2 L_3\right\}}\right]\theta_{13}$$

When Equations (5) and (6) are collectively represented by a determinant, the following equation (7) is obtained.

$$\begin{bmatrix} p_2 \\ p_3 \end{bmatrix} = \begin{bmatrix} \dfrac{\left(\dfrac{N_2}{N_1}\right)V_1V_2}{\omega L_2} + \dfrac{V_2\left(\dfrac{N_2}{N_3}\right)V_3}{\omega\left\{L_2+\left(\dfrac{N_2}{N_3}\right)^2 L_3\right\}} & -\dfrac{V_2\left(\dfrac{N_2}{N_3}\right)V_3}{\omega\left\{L_2+\left(\dfrac{N_2}{N_3}\right)^2 L_3\right\}} \\ -\dfrac{V_2\left(\dfrac{N_2}{N_3}\right)V_3}{\omega\left\{L_2+\left(\dfrac{N_2}{N_3}\right)^2 L_3\right\}} & \dfrac{\left(\dfrac{N_3}{N_1}\right)V_1V_3}{\omega L_3} + \dfrac{V_2\left(\dfrac{N_2}{N_3}\right)V_3}{\omega\left\{L_2+\left(\dfrac{N_2}{N_3}\right)^2 L_3\right\}} \end{bmatrix} \begin{bmatrix} \theta_{12} \\ \theta_{13} \end{bmatrix} \quad (7)$$

When the inverse matrix of Equation (7) is used, a relationship between phase differences θ12 and θ13 and powers P2 and P3 is expressed by the following equation (8). That is, phase differences θ12 and θ13 can be determined from powers P2 and P3 by using Equation (8).

$$\begin{bmatrix} \theta_{12} \\ \theta_{13} \end{bmatrix} = \begin{bmatrix} \dfrac{\left(\dfrac{N_2}{N_1}\right)V_1V_2}{\omega L_2} + \dfrac{V_2\left(\dfrac{N_2}{N_3}\right)V_3}{\omega\left\{L_2+\left(\dfrac{N_2}{N_3}\right)^2 L_3\right\}} & -\dfrac{V_2\left(\dfrac{N_2}{N_3}\right)V_3}{\omega\left\{L_2+\left(\dfrac{N_2}{N_3}\right)^2 L_3\right\}} \\ -\dfrac{V_2\left(\dfrac{N_2}{N_3}\right)V_3}{\omega\left\{L_2+\left(\dfrac{N_2}{N_3}\right)^2 L_3\right\}} & \dfrac{\left(\dfrac{N_3}{N_1}\right)V_1V_3}{\omega L_3} + \dfrac{V_2\left(\dfrac{N_2}{N_3}\right)V_3}{\omega\left\{L_2+\left(\dfrac{N_2}{N_3}\right)^2 L_3\right\}} \end{bmatrix}^{-1} \begin{bmatrix} p_2 \\ p_3 \end{bmatrix} \quad (8)$$

Therefore, extra power P23 can be determined from powers P1 and P2 through the following steps S1 to S3.

In step S1, Equation (8) is used to determine phase differences θ12 and θ13 from desired powers P1 and P2. In Equation (8), numbers N1 to N3 of turns of windings 43 to 45 of transformer 42, DC voltages V1 to V3, and inductances L2 and L3 of reactors 46 and 47 will be variables. Switching angular frequency ω is often a fixed value.

In step S2, phase differences θ12 and θ13 determined in step S1 are substituted into Equation (4) to determine phase difference θ23. In step S3, phase difference θ23 determined in step S2 is substituted into Equation (3) to determine power P23. Equation (3) has variables, as has been described in step S1.

A condition under which extra power transmission P23 has a minimum value or a minimum value will now be described. When expression (4) for calculating phase difference θ23 is substituted into expression (3) for calculating extra power P23, Equation (9) is obtained.

$$P_{23} = \dfrac{V_2\left(\dfrac{N_2}{N_3}\right)V_3}{\omega\left\{L_2+\left(\dfrac{N_2}{N_3}\right)^2 L_3\right\}}(\theta_{13}-\theta_{12}) \quad (9)$$

In Equation (9), the fractional portion of the first half of the equation is not zero except when voltage V2 or V3 is 0, whereas there is a condition under which the second half of the equation, or (θ13−θ12), equals zero (see FIG. 7).

The condition under which the second half of Equation (9), or (θ13−θ12), equals zero is expressed by Equation (10). When Equations (1) and (2) are substituted into Equation (10) and rearranged, Equation (11) is obtained. When Equation (11) has an operation variable and a design variable separated to the left side and the right side, Equation (12) is obtained.

$$(\theta_{13}-\theta_{12}) = 0 \quad (10)$$

$$\dfrac{L_3 P_{13}}{N_3 V_3} - \dfrac{L_2 P_{12}}{N_2 V_2} = 0 \quad (11)$$

$$\dfrac{V_2 P_{13}}{V_3 P_{12}} = \dfrac{N_3 L_2}{N_2 L_3} \quad (12)$$

In Equation (12), numbers N2 and N3 of turns of secondary windings 44 and 45 of transformer 42 and inductances L2 and L3 of reactors 46 and 47 are values determined when designing converter 4, and do not correspond to variables that are changed while the DC power supply and distribution system is in operation. It should be noted, however, that, as an exception, there may be a change in number of turns and inductance due to changes in characteristics of components with time, changes in temperature of the components, switching of a tap of the transformer and reactors, etc.

In contrast, while DC voltages V2 and V3 and powers P12 and P13 have rated values and upper and lower limit values determined when designing converter 4, DC voltages V2 and V3 and powers P12 and P13 correspond to variables that change while the DC power supply and distribution system is in operation.

Therefore, in order to minimize extra power transmission P23 represented by Equations (3) and (9), it is necessary to adjust operation variables V2, V3, P12, and P13 depending on design variables N2, N3, L2, and L.

In view of the above, in the DC power supply and distribution system according to the first embodiment, controllers 11 and 12 control converters 3 and 4, respectively, so that the relationship of Equation (12) is obtained. That is, controller 11 performs a first control operation, that is, controls converter 3 so that a ratio V2/V3 of DC voltages V2 and V3 of power distribution lines 1 and 2 is equal to a ratio N3/N2 of numbers N3 and N2 of turns of secondary windings 45 and 44 of transformer 42. DC voltages V2 and V3 are included in operation information ϕ5 supplied from operation information detector 5 to controller 11.

Further, controller 12 performs a second control operation, that is, controls converter 4 so that a ratio P12/P13 of powers P12 and P13 supplied from power generating and/or storing source 24 to power distribution lines 1 and 2 is equal to a ratio L3/L2 of inductances L3 and L2 of reactors 47 and 46. Powers P12 and P13 are included in operation information ϕ6 supplied from operation information detector 6 to controller 12.

Further, while the DC power supply and distribution system of the first embodiment performs the first and second control operations, the system plays its original role, that is, cutting, shifting, etc. a peak, to level power P received from commercial AC power source 23.

To do so, while performing the second control operation, controller 12 performs a third control operation, that is, changes a total amount of powers P12 and P13 depending on power P received from commercial AC power source 23 to cut, shift, etc. a peak while suppressing extra power P23. Power P received from commercial AC power source 23 is included in received-power information φ7 supplied from received-power-state detector 7 to controller 12.

Further, while performing the first and second control operations, the DC power supply and distribution system of the first embodiment performs a fourth control operation, that is, reduces power consumption of load groups 21 and 22. To do so, while performing the first control operation, controller 11 adjusts DC voltages V2 and V3 in magnitude to perform the fourth control operation to reduce the power consumption of load groups 21 and 22. That is, it adjusts DC voltages V2 and V3 in magnitude while controlling ratio V2/V3 of DC voltages V2 and V3 to be equal to ratio N3/N2 of numbers N3 and N2 of turns of secondary windings 45 and 44 of transformer 42.

Figure 10:
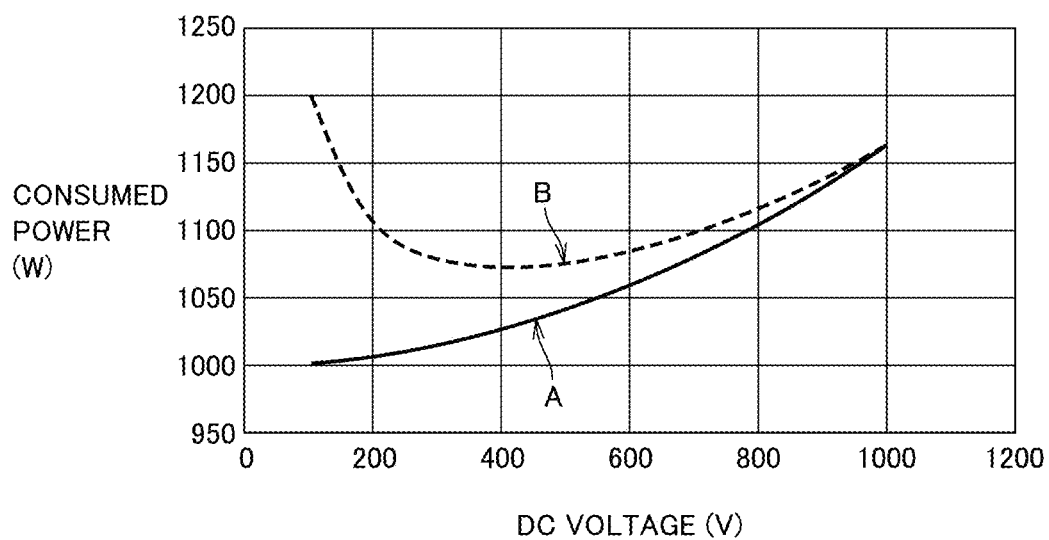
FIG. 10 represents by way of example load characteristics of load devices included in load groups shown in FIG. 1.

FIG. 10 represents load characteristics of load devices included in load groups 21 and 22. A load characteristic indicates a relationship between DC voltage (V) supplied to a load device and power consumption (W) of the load device. FIG. 10 shows two types of load characteristics A and B.

For load characteristic A indicated by a solid line, a load device consumes larger power in proportion to DC voltage supplied to the load device. For load characteristic B indicated by a broken line, when a load device receives a DC voltage lower than 400 V, the load device consumes smaller power in proportion to the received DC voltage, whereas when the load device receives a DC voltage larger than 400 V, the load device consumes larger power in proportion to the received DC voltage.

For both load characteristics A and B, the load device generally tends to provide an output decreasing as the DC voltage decreases. Therefore, reducing the DC voltage according to necessary output is effective as a method of reducing the power consumption of the load device. Note, however, that when the DC voltage is excessively reduced, the power consumption may turn to tending to increase, as for load characteristic B, and accordingly, it is necessary to keep voltage reduction to an appropriate range. In order to make such a decision as above, load state detectors 8 and 9 detect a load state and supply load information φ8 and φ9 indicating a detection result to controller 11.

Figure 11:
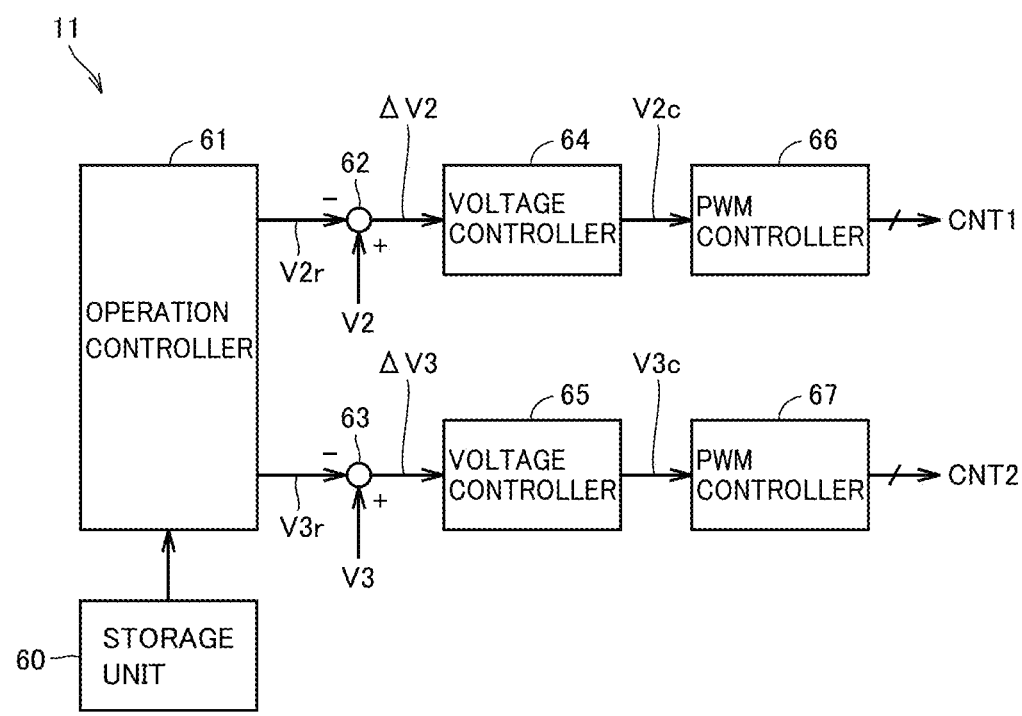
FIG. 11 is a block diagram illustrating by way of example a configuration of a controller 11 shown in FIG. 1.

FIG. 11 is a block diagram illustrating by way of example a configuration of controller 11. As shown in FIG. 11, controller 11 includes a storage unit 60, an operation controller 61, subtractors 62 and 63, voltage controllers 64 and 65, and PWM controllers 66 and 67. Storage unit 60 stores turn count ratio N3/N2, load characteristics of load groups 21 and 22, and the like.

Operation controller 61 generates reference voltages V1r and V2r based on the load characteristics of load groups 21 and 22 so that load groups 21 and 22 consume small power while maintaining voltage ratio V2/V3 at turn count ratio N3/N2 based on contents stored in storage unit 60.

Subtractor 62 calculates a deviation ΔV2 between DC voltage V2 included in operation information φ5 received from operation information detector 5 and reference voltage V2r. Subtractor 63 calculates a deviation ΔV3 between DC voltage V3 included in operation information φ5 received from operation information detector 5 and reference voltage V3r.

Voltage controller 64 generates a voltage command value V2c so that DC voltage V2 is equal to reference voltage V2r and deviation ΔV2 is eliminated. Voltage controller 65 generates a voltage command value V3c so that DC voltage V3 is equal to reference voltage V3r and deviation ΔV3 is eliminated.

PWM controller 66 generates a control signal CNT1 in response to voltage command value V2c for controlling DC/DC conversion unit 32 (FIG. 2). PWM controller 67 generates a control signal CNT2 in response to voltage command value V3c for controlling DC/DC conversion unit 33 (FIG. 2).

Figure 12:
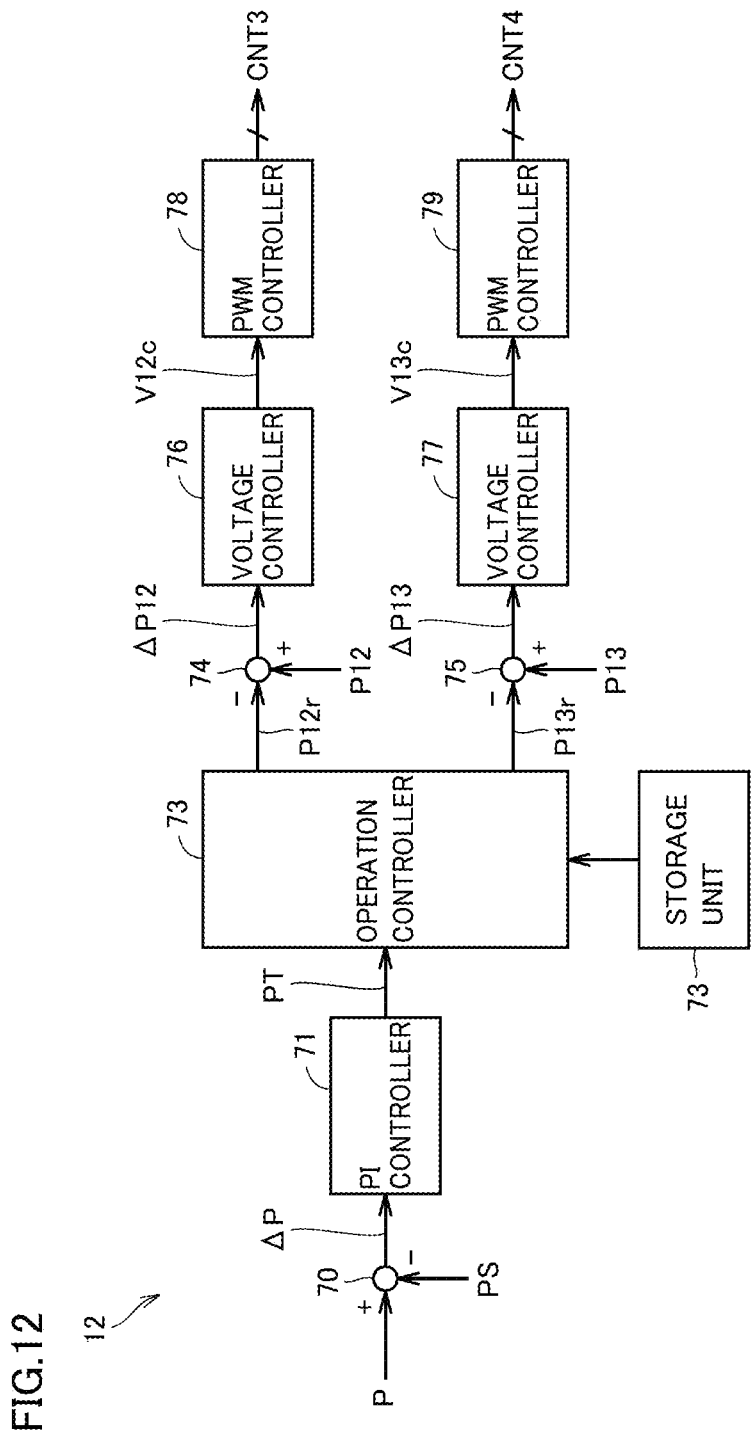
FIG. 12 is a block diagram illustrating by way of example a configuration of a controller 12 shown in FIG. 1.

FIG. 12 is a block diagram illustrating a configuration of controller 12. As shown in FIG. 12, controller 12 includes subtractors 70, 74 and 75, a PI (Proportional Integral) controller 71, a storage unit 72, an operation controller 73, voltage controllers 76 and 77, and PWM controllers 78 and 79.

A basic function of the DC power supply and distribution system is to receive AC voltage VAC from commercial AC power source 23, convert AC voltage VAC into DC voltages V2 and V3 and supply DC voltages V2 and V3 to load groups 21 and 22, and an additional function thereof is to suppress an effect of load groups 21 and 22 on commercial AC power source 23. Accordingly, a basic method of using power generating and/or storing source 24 is to charge and discharge power generating and/or storing source 24 so that AC power P supplied (or power P received) from commercial AC power source 23 is equal to or less than a desired set value PS.

Desired set value PS serves as an upper limit value or a target value set for received power P in response to a request received from a user who conducts energy management, a remote controller, or the like. Hereinafter, desired set value PS will also be referred to as a value set for purchasing power. In this DC power supply and distribution system, an output power target value PT is generated such that at the current point in time or a point in time immediately therebefore, received power P is equal to or less than value PS set for purchasing power.

Therefore, subtractor 70 calculates a deviation ΔP=P−PS between received power P and value PS set for purchasing power. AC power P is included in received-power information φ7 received from received-power-state detector 7. PI controller 71 subjects deviation ΔP to PI control to generate output power target value PT.

Output power target value PT is a value corresponding to a total value of DC powers P12 and P13 supplied from power generating and/or storing source 24 to power distribution lines 1 and 2 via converter 4 (i.e., P12+P13). When received power P exceeds value PS set for purchasing power, output power target value PT positive in polarity can be obtained. When output power target value PT is positive in polarity, DC power is supplied from power generating and/or storing source 24 to load groups 21 and 22 via converter 4. Although not shown, by adding a limiter for upper and lower limits to output power target value PT, it is possible to suppress charging or discharging of power generating and/or storing source 24, as necessary.

Storage unit 72 stores ratio L3/L2 of inductances L3 and L2 of reactors 47 and 46. Operation controller 73 generates reference powers P12r and P13r based on output power target value PT received from PI controller 71 and inductance ratio L3/L2 stored in storage unit 72. It should be noted that P12r+P13r=PT. P12r/P13r=L3/L2.

Subtractor 74 calculates a deviation ΔP12 between power P12 included in operation information φ6 received from operation information detector 6 and reference power P12r. Subtractor 75 calculates a deviation ΔP13 between power P13 included in operation information φ6 received from operation information detector 6 and reference power P13r.

Voltage controller 76 generates a voltage command value V12c so that power P12 is equal to reference power P12r and deviation ΔP12 is eliminated. Voltage controller 77 generates a voltage command value V13c so that power P13 is equal to reference power P13r and deviation ΔP13 is eliminated.

PWM controller 78 generates a control signal CNT3 in response to voltage command value V12c for controlling AC/DC conversion unit 48 (FIG. 3). PWM controller 79 generates a control signal CNT4 in response to voltage command value V13c for controlling AC/DC conversion unit 49 (FIG. 3).

Hereinafter, an operation of the DC power transmission and distribution system shown in FIGS. 1 to 12 will be described. In this DC power transmission and distribution system, a plurality of loads are divided into a first group and a second group, and the first group, or load group 21 (FIG. 1), is connected to power distribution line 1 and load state detector 8 and the second group, or load group 22, is connected to power distribution line 2 and load state detector 9.

Controller 11 and converter 3 operate to set DC voltage ratio V2/V3 of power distribution lines 1 and 2 to turn count ratio N3/N2 of windings 45 and 44 of transformer 42 and thus suppress an amount of power lost due to extra power P23 transmitted within converter 4.

Further, received-power-state detector 7 (FIG. 1) operates to detect power P received from commercial AC power source 23 and provide it to controller 12. Controller 12 and converter 4 operate to control power P12 and power P13 so that received power P is equal to or lower than value PS set for purchasing power and ratio P12/P13 of power P12 and power P13 supplied from power generating and/or storing source 24 to power distribution lines 1 and 2 is equal to ratio L3/L2 of inductances 1 and L2 of reactors 47 and 46.

As described above, in the first embodiment, DC voltages V2 and V3 are controlled so that DC voltage ratio V2/V3 of power distribution lines 1 and 2 is equal to turn count ratio N3/N2 of windings 45 and 44 of transformer 42 (FIG. 3), and powers P12 and P13 are controlled so that ratio P12/P13 of powers P12 and P13 supplied from power generating and/or storing source 24 to power distribution lines 1 and 2 is equal to ratio L3/L2 of inductances L3 and L2 of reactors 47 and 46. This allows converter 4 to be enhanced in efficiency and hence the system to be generally enhanced in efficiency.

While in the first embodiment is described a case in which one set of power generating and/or storing source 24 and converter 4 is provided, a plurality of sets each of power generating and/or storing source 24 and converter 4 may be provided. When a plurality of sets each of power generating and/or storing source 24 and converter 4 are provided, controller 12 and operation information detector 6 are provided for each set. Alternatively, one controller 12 may be shared by a plurality of converters 4.

Second Embodiment in the first embodiment, ratio V2/V3 of DC voltages V2 and V3 of power distribution lines 1 and 2 is maintained at turn count ratio N3/N2. However, a case may be considered in which a total power consumption of load groups 21 and 22 is reduced by causing ratio V2/V3 of DC voltages V2 and V3 to deviate from turn count ratio N3/N2. Accordingly, in a second embodiment, other than performing the first to fourth control operations described in the first embodiment, a fifth control operation is performed, that is, DC voltage ratio V2/V3 is caused to deviate from turn count ratio N3/N2 in a region in which load groups 21 and 22 consume power in an amount exceeding an amount of power lost due to extra power P23 transmitted within converter 4.

Specifically, when load groups 21 and 22 have an operating rate (or provide an output) close to a stopped state of load groups 21 and 22 and consume an amount of power closer to zero, it can be said that there is little room for the amount of power consumption of load groups 21 and 22 to be improved by adjusting DC voltage ratio V2/V3.

Accordingly, when load groups 21 and 22 have a total operating rate Ro (or provide an output) larger than a threshold value TH, DC voltage ratio V2/V3 is permitted to deviate from turn count ratio N3/N2, whereas when total operating rate Ro is smaller than threshold value TH, DC voltage ratio V2/V3 is maintained at turn count ratio N3/N2. Operating rates Ro1 and Ro2 of load groups 21 and 22 are included in load information φ8 and φ9 supplied from load state detectors 8 and 9 to controller 11. Note that Ro=Ro1+Ro2.

In order to prevent hunting, first and second threshold values TH1 and TH2 may be provided to cause controller 11 to perform a hysteresis operation. Note that TH1<TH2. When load groups 21 and 22 have total operating rate Ro (or output) increasing from a value smaller than first threshold value TH1, controller 11 permits DC voltage ratio V2/V3 to deviate from turn count ratio N3/N2 in response to total operating rate Ro exceeding second threshold value TH2.

In contrast, when load groups 21 and 22 have total operating rate Ro (or output) decreasing from a value larger than second threshold value TH2, controller 11 maintains DC voltage ratio V2/V3 at turn count ratio N3/N2 in response to total operating rate Ro decreasing below first threshold value TH1.

Figure 13:
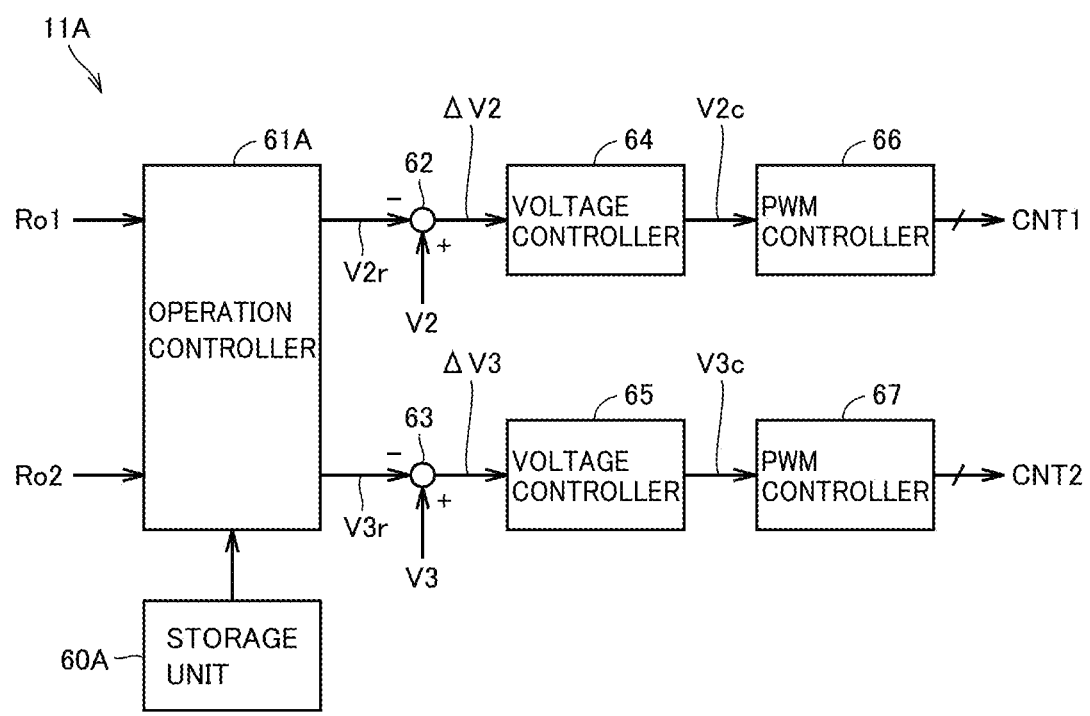
FIG. 13 is a block diagram showing a major part of a DC power supply and distribution system according to a second embodiment.

The second embodiment is different from the first embodiment in that controller 11 is replaced with a controller 11A. FIG. 13 is a block diagram illustrating a configuration of controller 11A. As shown in FIG. 13, controller 11A corresponds to controller 11 having storage unit 60 and operation controller 61 replaced with a storage unit 60A and an operation controller 61A, respectively. Storage unit 60A stores turn count ratio N3/N2, load characteristics of load groups 21 and 22, threshold value TH, etc.

Operation controller 61A generates reference voltages V2r and V3r based on contents stored in storage unit 60A and operating rates Ro1 and Ro2 of load groups 21 and 22 included in load information φ8 and φ9 received from load state detectors 8 and 9.

When a sum of operating rates Ro1 and Ro2 of load groups 21 and 22, or total operating rate Ro, is larger than threshold value TH, operation controller 61A causes voltage ratio V2/V3 to deviate from turn count ratio N3/N2, and generates reference voltages V1r and V2r based on the load characteristics of load groups 21 and 22 so that load groups 21 and 22 consume small power.

When the sum of operating rates Ro1 and Ro2 of load groups 21 and 22, or total operating rate Ro, is smaller than threshold value TH, operation controller 61A generates reference voltages V1r and V2r based on the load characteristics of load groups 21 and 22 while maintaining voltage ratio V2/V3 at turn count ratio N3/N2 so that load groups 21 and 22 consume small power.

An operation of the DC power transmission and distribution system according to the second embodiment will now be described. In this DC power transmission and distribution system, a plurality of loads are divided into a first group and a second group, and the first group, or load group 21 (FIG. 1), is connected to power distribution line 1 and load state detector 8 and the second group, or load group 22, is connected to power distribution line 2 and load state detector 9.

Load state detectors 8 and 9 operate to detect and provide operating rates Ro1 and Ro2 of load groups 21 and 22 to controller 11A. When a sum of operating rates Ro1 and Ro2 of load groups 21 and 22, or total operating rate Ro, is larger than threshold value TH controller 11A and converter 3 operate to permit DC voltage ratio V2/V3 of power distribution lines 1 and 2 to deviate from turn count ratio N3/N2 of windings 45 and 44 of transformer 42 (FIG. 3) to improve power consumption of load groups 21 and 22.

When total operating rate Ro is smaller than threshold value TH, controller 11A and converter 3 operate to set DC voltage ratio V2/V3 of power distribution lines 1 and 2 to turn count ratio N3/N2 of windings 45 and 44 of transformer 42 to suppress an amount of power lost due to extra power P23 transmitted within converter 4.

Further, received-power-state detector 7 (FIG. 1) operates to detect power P received from commercial AC power source 23 and provide it to controller 12. Controller 12 and converter 4 operate to control power P12 and power P13 so that received power P is equal to or lower than value PS set for purchasing power and ratio P12/P13 of power P12 and power P13 supplied from power generating and/or storing source 24 to power distribution lines 1 and 2 is equal to ratio L3/L2 of inductances L3 and L2 of reactors 47 and 46. The remainder in configuration and operation is the same as the first embodiment, and accordingly, will not be described repeatedly.

Thus, in the second embodiment, when total operating rate Ro of load groups 21 and 22 is larger than threshold value TH, voltage ratio V2/V3 is caused to deviate from turn count ratio N3/N2 and reference voltages V1*r* and V2*r* are generated based on the load characteristics of load groups 21 and 22 so that load groups 21 and 22 consume small power. In addition to the same effect as the first embodiment, an amount of power consumed by load groups 21 and 22 can be improved.

It should be understood that the embodiments disclosed herein have been described for the purpose of illustration only and in anon-restrictive manner in any respect. The present disclosure is defined by the terms of the claims, rather than the description above, and is intended to include any modifications within the meaning and scope equivalent to the terms of the claims.

REFERENCE SIGNS LIST

1, 2 power distribution line, 3, 4 converter, 5, 6 operation information detector, 7 received-power-state detector 8, 9 load state detector, 11, 11A, 12 controller, 11*a*, 12*a* processing circuit, 21, 22 load group, 23 commercial AC power source, 24 power generating and/or storing source, 31, 48, 49 AC/DC conversion unit, 32, 33 DC/DC conversion unit, 41 DC/AC conversion unit, 42 transformer, 43 primary winding 44, 45 secondary winding, 46, 47 reactor, Q1-Q4 IGBT, D1-D4 diode, 55-57 resistive element, 60, 60A, 72 storage unit, 61, 61A, 73 operation controller, 62, 63, 70, 74, 75 subtractor, 64, 65, 76, 77 voltage controller, 66, 67, 78, 79 PWM controller.

The invention claimed is:

1. A direct-current power supply and distribution system comprising:
    a plurality of power distribution lines each connected to a respective one of a plurality of loads;
    a first converter to receive a voltage from a first power source, convert the received voltage into a plurality of direct-current voltages, and supply each of the plurality of direct-current voltages to a respective one of the plurality of power distribution lines;
    a second converter to receive a power from a second power source, convert the received power into a plurality of direct-current powers, and supply each of the plurality of direct-current powers to a respective one of the plurality of power distribution lines; and
    a first controller to control the first converter so that a ratio of the plurality of direct-current voltages is a predetermined first ratio.

2. The direct-current power supply and distribution system according to claim 1, wherein
    the second converter includes a transformer,
    the transformer includes a primary winding and a plurality of secondary windings each corresponding to a respective one of the plurality of power distribution lines, and
    the predetermined first ratio is set based on a ratio of the plurality of secondary windings in number of turns.

3. The direct-current power supply and distribution system according to claim 1, further comprising a plurality of load state detectors to each detect a state of a respective one of the plurality of loads, wherein
    the first controller is further to control the plurality of direct-current voltages, based on a detection result of the plurality of load state detectors, while maintaining the ratio of the plurality of direct-current voltages at the predetermined first ratio, so that the plurality of loads consume reduced power.

4. The direct-current power supply and distribution system according to claim 3, wherein
    the plurality of load state detectors are each to detect an operating ratio of the respective one of the plurality of loads,
    the first controller is further to maintain the ratio of the plurality of direct-current voltages at the predetermined first ratio in response to a sum of the operating ratios of the plurality of loads being smaller than a threshold value, and
    the first controller is not to maintain the ratio of the plurality of direct-current voltages at the predetermined first ratio in response to the sum of the operating ratios of the plurality of loads being larger than the threshold value.

5. The direct-current power supply and distribution system according to claim 1, further comprising a second controller to control the second converter so that a ratio of the plurality of direct-current powers is a predetermined second ratio.

6. The direct-current power supply and distribution system according to claim 5, wherein
    the second converter includes a plurality of inductances each corresponding to a respective one of the plurality of power distribution lines, and
    the predetermined second ratio is set based on the plurality of inductances.

7. The direct-current power supply and distribution system according to claim 5, further comprising a received-power-state detector to detect power supplied from the first power source, wherein
the second controller is further to control the second converter so that the ratio of the plurality of direct-current powers is the predetermined second ratio and a power value detected by the received-power-state detector is smaller than a predetermined value.

8. The direct-current power supply and distribution system according to claim 1, wherein
the first power source is a commercial alternating-current power source or a direct-current power source, and
the second power source is a power generating and/or storing source to output direct-current power.

9. The direct-current power supply and distribution system according to claim 2, further comprising a second controller to control the second converter so that a ratio of the plurality of direct-current powers is a predetermined second ratio.

10. The direct-current power supply and distribution system according to claim 9, wherein
the second converter includes a plurality of inductances each corresponding to a respective one of the plurality of power distribution lines, and
the predetermined second ratio is set based on the plurality of inductances.

11. The direct-current power supply and distribution system according to claim 3, further comprising a second controller to control the second converter so that a ratio of the plurality of direct-current powers is a predetermined second ratio.

12. The direct-current power supply and distribution system according to claim 11, further comprising a received-power-state detector to detect power supplied from the first power source, wherein
the second controller is further to control the second converter so that the ratio of the plurality of direct-current powers is the predetermined second ratio and a power value detected by the received-power-state detector is smaller than a predetermined value.

13. The direct-current power supply and distribution system according to claim 9, further comprising a received-power-state detector to detect power supplied from the first power source, wherein
the second controller is further to control the second converter so that the ratio of the plurality of direct-current powers is the predetermined second ratio and a power value detected by the received-power-state detector is smaller than a predetermined value.

14. The direct-current power supply and distribution system according to claim 13, further comprising a plurality of load state detectors to each detect a state of a respective one of the plurality of loads, wherein
the first controller is further to control the plurality of direct-current voltages, based on a detection result of the plurality of load state detectors, while maintaining the ratio of the plurality of direct-current voltages at the predetermined first ratio, so that the plurality of loads consume reduced power.

15. The direct-current power supply and distribution system according to claim 14, wherein
the plurality of load state detectors are each to detect an operating ratio of the respective one of the plurality of loads,
the first controller is further to maintain the ratio of the plurality of direct-current voltages at the predetermined first ratio in response to a sum of the operating ratios of the plurality of loads being smaller than a threshold value, and
the first controller is not to maintain the ratio of the plurality of direct-current voltages at the predetermined first ratio in response to the sum of the operating ratios of the plurality of loads being larger than the threshold value.

16. The direct-current power supply and distribution system according to claim 10, further comprising a received-power-state detector to detect power supplied from the first power source, wherein
the second controller is further to control the second converter so that the ratio of the plurality of direct-current powers is the predetermined second ratio and a power value detected by the received-power-state detector is smaller than a predetermined value.

17. The direct-current power supply and distribution system according to claim 16, further comprising a plurality of load state detectors to each detect a state of a respective one of the plurality of loads, wherein
the first controller is further to control the plurality of direct-current voltages, based on a detection result of the plurality of load state detectors, while maintaining the ratio of the plurality of direct-current voltages at the predetermined first ratio, so that the plurality of loads consume reduced power.

18. The direct-current power supply and distribution system according to claim 17, wherein
the plurality of load state detectors are each to detect an operating ratio of the respective one of the plurality of loads,
the first controller is further to maintain the ratio of the plurality of direct-current voltages at the predetermined first ratio in response to a sum of the operating ratios of the plurality of loads being smaller than a threshold value, and
the first controller is not to maintain the ratio of the plurality of direct-current voltages at the predetermined first ratio in response to the sum of the operating ratios of the plurality of loads being larger than the threshold value.

* * * * *